United States Patent
Harvey

(10) Patent No.: US 11,077,952 B2
(45) Date of Patent: Aug. 3, 2021

(54) ELECTRIC DUCTED FAN

(71) Applicant: ROLLS-ROYCE plc, London (GB)

(72) Inventor: Giles E. Harvey, Derby (GB)

(73) Assignee: Rolls-Royce plc

(*) Notice: Subject to any disclaimer, the term of this patent is extended or adjusted under 35 U.S.C. 154(b) by 324 days.

(21) Appl. No.: 16/390,553

(22) Filed: Apr. 22, 2019

(65) Prior Publication Data

US 2019/0344899 A1    Nov. 14, 2019

(30) Foreign Application Priority Data

May 14, 2018 (GB) ...................................... 1807769

(51) Int. Cl.
*B64D 27/24* (2006.01)

(52) U.S. Cl.
CPC .................................. *B64D 27/24* (2013.01)

(58) Field of Classification Search
CPC ............ B64D 27/24; B64D 2033/0286; B64D 2033/0293
USPC .......................................................... 244/62
See application file for complete search history.

(56) References Cited

U.S. PATENT DOCUMENTS

| | | | | |
|---|---|---|---|---|
| 3,078,061 A | * | 2/1963 | Marie | F02K 7/04 244/12.1 |
| 4,927,329 A | * | 5/1990 | Kliman | B64D 41/00 416/127 |
| 5,149,012 A | * | 9/1992 | Valverde | B64C 29/0025 244/12.2 |
| 9,321,538 B2 | * | 4/2016 | Edwards | E02D 27/425 |
| 2004/0255590 A1 | * | 12/2004 | Rago | F02C 7/32 60/772 |
| 2006/0254255 A1 | * | 11/2006 | Okai | F02K 3/06 60/226.1 |

(Continued)

FOREIGN PATENT DOCUMENTS

| | | |
|---|---|---|
| CN | 105416573 | 3/2016 |
| CN | 206615387 | 11/2017 |

(Continued)

OTHER PUBLICATIONS

Great Britain search report dated Nov. 12, 2018, issued in Great Britain Patent Application No. 1807769.3.
Great Britain search report dated Nov. 13, 2018, issued in Great Britain Patent Application No. 1807770.1.
EP search report dated Sep. 30, 2019, issued in EP Patent Application No. 19169236.

(Continued)

*Primary Examiner* — Christopher P Ellis
(74) *Attorney, Agent, or Firm* — Barnes & Thornburg LLP

(57) ABSTRACT

An electric ducted fan for an aircraft is shown. A nacelle defines a duct that houses a propulsive fan having a fan diameter $D_F$. An electric machine is configured to drive the fan, and has an electromagnetically active length $L_A$ and an electromagnetically active diameter $D_A$ defining an aspect ratio ($L_A/D_A$) of from 0.8 to 2. A ratio of the electromagnetically active diameter $D_A$ to the fan diameter $D_F$ ($D_A/D_F$) is from 0.45 to 0.60.

15 Claims, 4 Drawing Sheets

(56) References Cited

U.S. PATENT DOCUMENTS

| | | | |
|---|---|---|---|
| 2008/0175703 A1* | 7/2008 | Lugg | F02C 7/36 |
| | | | 415/66 |
| 2009/0289516 A1* | 11/2009 | Hopewell | H02K 16/005 |
| | | | 310/115 |
| 2010/0107651 A1* | 5/2010 | Hyde | F02C 6/18 |
| | | | 60/784 |
| 2014/0203739 A1* | 7/2014 | Chantriaux | H02P 5/74 |
| | | | 318/139 |
| 2014/0248168 A1* | 9/2014 | Chantriaux | B64C 27/14 |
| | | | 417/410.1 |
| 2017/0291693 A1 | 10/2017 | Niergarth et al. | |
| 2017/0297727 A1 | 10/2017 | Niergarth et al. | |
| 2018/0044028 A1* | 2/2018 | Takami | B64D 27/18 |
| 2020/0040846 A1* | 2/2020 | Lugg | F02K 3/077 |
| 2021/0078700 A1* | 3/2021 | Klemen | B60L 53/20 |

FOREIGN PATENT DOCUMENTS

| | | |
|---|---|---|
| CN | 107719671 | 2/2018 |
| EP | 3243753 | 11/2017 |

OTHER PUBLICATIONS

EP search report dated Oct. 1, 2019, issued in EP Patent Application No. 19169237.

Welstead, Jason R. et al., "Conceptual Design of a Single-Aisle Turboelectric Commercial Transport with Fuselage Boundary Layer Ingestion," American Institute of Aeronautics and Astronautics, Jan. 4, 2016.

* cited by examiner

ELECTRIC DUCTED FAN

CROSS-REFERENCE TO RELATED APPLICATIONS

This application is based upon and claims the benefit of priority from British Application No. 1807769.3 filed on May 14, 2018 the entire contents of which are incorporated by reference.

BACKGROUND

Technical Field

This disclosure relates to configurations of electric ducted fans for aircraft.

Description of the Related Art

Ducted fan propulsors are used for a large proportion of aircraft due to their greater efficiency and reduced noise due to lower tip losses than open propellers. Turbofans utilise a gas turbine core to drive a fan, the fan being larger than the core to produce a bypass flow responsible for the majority of thrust.

Despite great advances in materials, compressor and turbine aerodynamics, and combustion efficiency, the gas turbine engines used in the cores of turbofans are still quite thermally inefficient. In particular, gas turbines are less efficient the smaller they are, which restricts possibilities in terms of the number of engines that may be installed on an airframe. Their fuel source is also not renewable. Further, the jet of high enthalpy exhaust from the core is responsible for a large amount of noise when it mixes with the exhausted bypass flow.

It is therefore desirable to utilise electric machines in place of gas turbine engines in ducted fan arrangements to alleviate some or all of the aforesaid issues.

SUMMARY

The present disclosure is directed towards electric ducted fans for aircraft.

One such electric ducted fan comprises a nacelle defining a duct, and a propulsive fan in the duct having a fan diameter $D_F$. An electric machine is coupled to the fan. The electric machine has an electromagnetically active length $L_A$ and an electromagnetically active diameter $D_A$ defining an aspect ratio ($L_A/D_A$) of from 0.8 to 2. A ratio of the electromagnetically active diameter $D_A$ to the fan diameter $D_F$ ($D_A$ to $D_F$) is from 0.45 to 0.60.

Electric ducted fans constructed in such a manner have various advantages, such as reduced nacelle drag, a shorter pylon, and increased ground clearance.

DESCRIPTION OF THE DRAWINGS

Embodiments will now be described by way of example only with reference to the accompanying drawings, which are purely schematic and not to scale, and in which.

DETAILED DESCRIPTION

Figure 1:
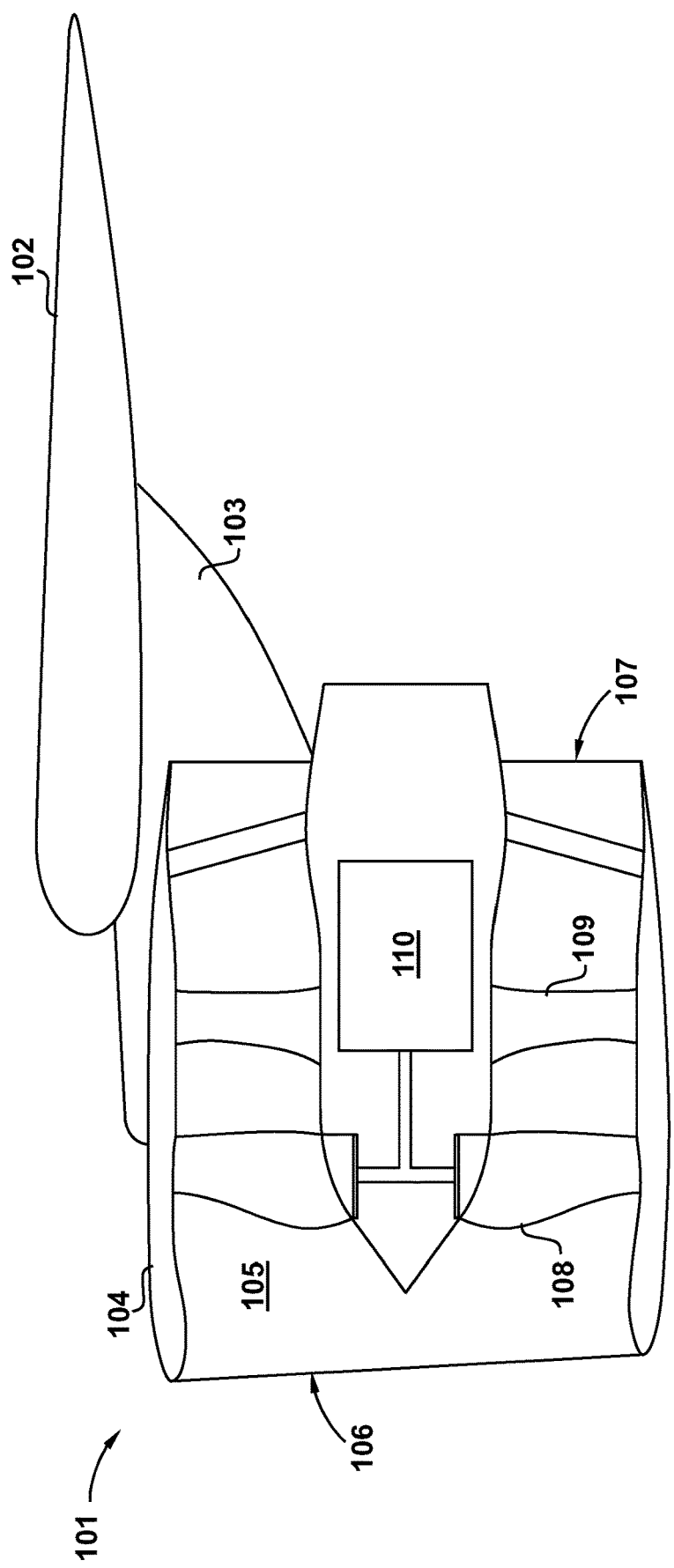
FIG. 1 shows an electric ducted fan propulsor which uses an electric machine to drive a fan.

An electric ducted fan propulsor is shown in FIG. 1.

The propulsor is shown generally at 101, attached to a wing 102 of an aircraft (not shown) by a pylon 103.

Being a ducted fan, the propulsor 101 comprises a nacelle 104 which defines a duct 105 having an inlet 106 and a nozzle 107, and in which a propulsive fan 108 is located. In operation, the fan 108 raises the pressure of intake air, with swirl in the airflow being removed by outlet guide vanes 109. The airflow is directed through the nozzle 107 to generate thrust. In the embodiment of FIG. 1, the fan 108 is driven by an electric machine 110.

In the present embodiment, the electric machine 110 is rated at a maximum continuous power of between 100 kilowatts and 100 megawatts. In a specific embodiment, the electric machine 110 is rated at a maximum continuous power of between 1 megawatt and 10 megawatts. In a more specific embodiment, the electric machine 110 is rated at 2 megawatts maximum continuous.

Figure 2:
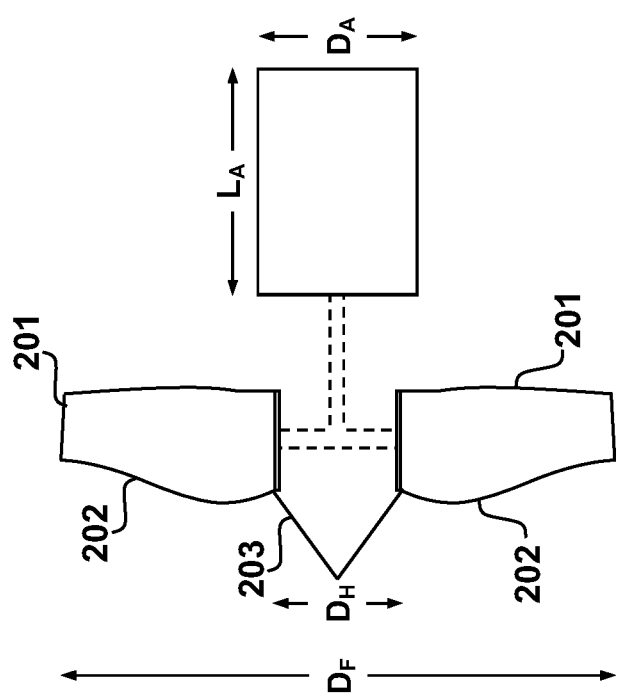
FIG. 2 shows definitions of various geometric parameters.

Thus, as illustrated in FIG. 2, the arrangement of FIG. 1 permits a combination of a fan having a high hub-tip ratio, and a high aspect ratio electric machine, in terms of its length-to-diameter.

The hub-tip ratio of the fan 108 in the present example is the ratio of the diameter $D_F$ of the leading edge of the fan blades 201, to the diameter of the diameter $D_H$ of the hub 202 at the leading edge of the fan blades 201, i.e. the diameter of the inner gas-washed surface of the fan 108. It will be appreciated that the hub-tip ratio is a standard, well known property of a fan, compressor, or turbine stage.

The length of the electric machine as defined herein is the maximum length $L_A$ of the electromagnetically active components, whilst the diameter of the electric machine as defined herein is the maximum diameter $D_A$ of the electromagnetically active components. Examples of the definitions of length $L_A$ and diameter $D_A$ as applied to specific machine types will be described further with reference to FIG. 4.

Benefits are obtained by specifying the following parameters for the propulsor 101:

(i) the aspect ratio of electric machine (110 $L_A/D_A$, i.e. the value of $L_A$ divided by $D_A$) being from 0.8 to 2;

(ii) the ratio of the diameters of the electromagnetically active components in the electric machine and the fan ($D_A/D_F$, i.e. the value of $D_A$ divided by $D_F$) being from 0.45 to 0.60.

In particular, the inventor has discovered that this combination of values advantageously enables the propulsor 101 to have a smaller diameter nozzle 107 for the same overall fan pressure ratio, which allows the pylon 103 to be made shorter. This results in, for a particular fan diameter $D_F$, greater ground clearance, or a greater fan diameter $D_F$ for a particular ground clearance. Further, the reduction in pylon length and height results in a reduced moment on the wing 102, and a reduction in weight.

In a specific embodiment, the ratio $L_A/D_A$ is from 1.1 to 1.7. The inventor has discovered that this allows a narrowed nozzle, along with a higher speed machine. In another specific embodiment, $L_A/D_A$ is from 1.3 to 1.5. In a more specific embodiment, $L_A/D_A$ is 1.4. In an additional or an alternative embodiment, the ratio $D_A/D_F$ is from 0.50 to 0.55. In a more specific embodiment, the ratio $D_A/D_F$ may be 0.525. The hub-tip ratio of the fan 108, i.e. the value of $D_T/D_H$, may be from 0.24 to 0.32. In a specific embodiment, the hub-tip ratio may be from 0.26 to 0.3. In a more specific embodiment, the hub-tip ratio may be 0.28.

In an embodiment, the fan 108 has a tip pressure ratio (i.e. the ratio of the stagnation pressure immediately upstream of the tip of a fan blade 201, and immediately downstream of the fan blade 201) of from 1.3 to 1.7 at an altitude of 35,000 feet above sea level and a temperature of minus 54 degrees Celsius (i.e. ISA+0 standard conditions), and a true airspeed of Mach 0.85, i.e. during cruise conditions. In a specific embodiment, the tip pressure ratio may be from 1.4 to 1.6 in the aforesaid conditions. In a more specific embodiment, the tip pressure ratio may be 1.5 in the aforesaid conditions.

Figure 3:
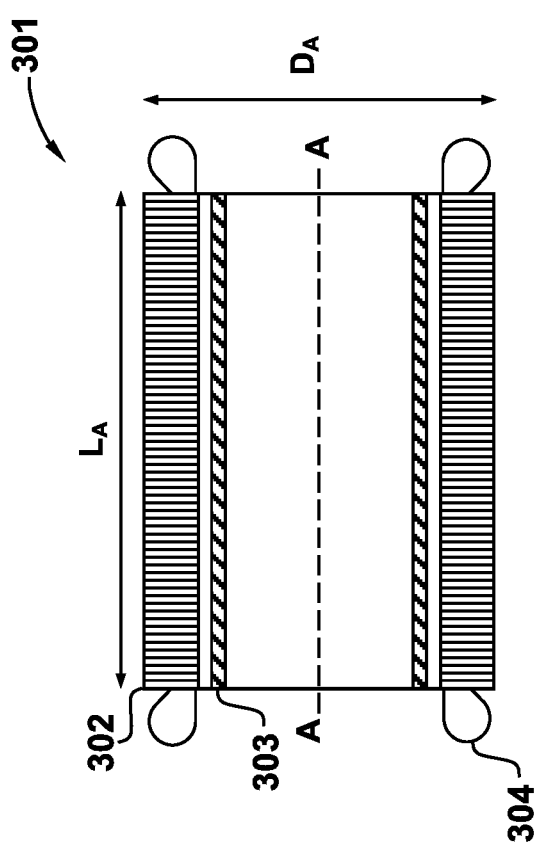
FIG. 3 shows one configuration of the electric machine.

An example of a configuration of the electric machine 101 is shown in cross-section through its central axis A-A in FIG. 3. This particular configuration is a radial flux electric machine 301, which comprises a stator 302 which surrounds a rotor 303. The stator 302 comprises a lamination stack of the known type. In the present example, the electric machine is a permanent-magnet machine and thus the rotor 303 comprises permanent magnets, which interact with the magnetic field generated by windings in the stator 302 to generate torque. Alternative machine types such as induction machines may also be employed. As a radial flux machine, end windings 304 emerge axially from the lamination stack of the stator 302.

As described previously, the electric machine 301 may be described as having an electromagnetically active length $L_A$ and an electromagnetically active diameter $D_A$. As used herein, "electromagnetically active" refers to the region responsible for generating torque upon the rotor. Thus in the present example, the length $L_A$ is the length of the lamination stack of the stator 302, and does not include the end windings 304 as they do not generate an appreciable torque upon the rotor 303. Similarly, the diameter $D_A$ is the diameter of the lamination stack of the stator 302.

Put another way, the "electromagnetically active" parts of the electric machine 301 may be characterised as those components which form part of the torque-generating magnetic circuit in the machine.

Those skilled in the art will appreciate how this definition may read across to other machine types such electromagnet-based synchronous motors, and axial flux machines, with the definitions of aspect ratio as set out herein also applying to these types of machine.

Figure 4:
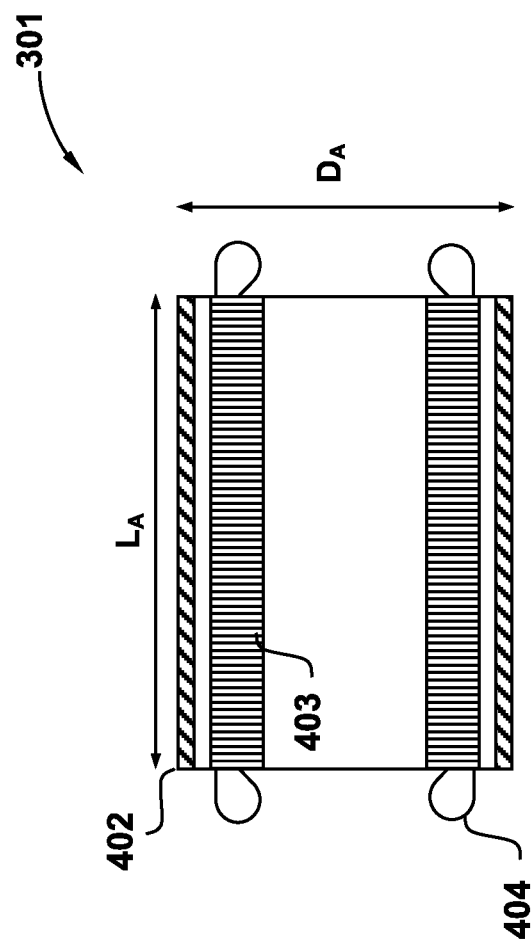
FIG. 4 shows another configuration of the electric machine.

Another example configuration of the electric machine 101 is shown in cross-section through its central axis A-A in FIG. 4. This particular configuration is a radial flux electric machine 401, which comprises a rotor 402 which surrounds a stator 403. As with electric machine 301, the electromagnetically active length $L_A$ of this machine is the length of the lamination stack of the stator 403, not including the end windings 404. The electromagnetically active diameter $D_A$ is, however, in this embodiment, the diameter of the rotor 402. Again, machine 401 is a permanent-magnet machine, and thus the diameter $D_A$ is bounded by the greatest radial extent of the magnets therein. Should the machine instead be an induction machine, the diameter $D_A$ would be defined by the greatest radial extent of the rotor iron.

More generally, as described with reference to FIG. 3, it will be appreciated the "electromagnetically active" parts of the electric machine 401 may be characterised as those components which form part of the torque-generating magnetic circuit in the machine.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electric ducted fan for an aircraft, comprising:
   a nacelle defining a duct;
   a propulsive fan in the duct having a fan diameter $D_F$;
   an electric machine configured to drive the fan, the electric machine having an electromagnetically active length $L_A$ and an electromagnetically active diameter $D_A$ defining an aspect ratio ($L_A/D_A$) of from 0.8 to 2;
   and wherein a ratio of the electromagnetically active diameter $D_A$ to the fan diameter $D_F$ ($D_A/D_F$) is from 0.45 to 0.60.

2. The electric ducted fan of claim 1, in which the aspect ratio ($L_A/D_A$) is from 1.1 to 1.7.

3. The electric ducted fan of claim 2, in which the aspect ratio ($L_A/D_A$) is from 1.3 to 1.5, for example 1.4.

4. The electric ducted fan of claim 1, in which the ratio of the electromagnetically active diameter $D_A$ to the fan diameter $D_F$ ($D_A/D_F$) is from 0.50 to 0.55.

5. The electric ducted fan of claim 4, in which the ratio of the electromagnetically active diameter $D_A$ to the fan diameter $D_F$ ($D_A/D_F$) is 0.525.

6. The electric ducted fan of claim 1, in which the electric machine is a radial flux electric machine.

7. The electric ducted fan of claim 6, in which the stator is exterior to the rotor, the electromagnetically active diameter $D_A$ is the diameter of a stator stack, and the electromagnetically active length $L_A$ is the length of the stator stack.

8. The electric ducted fan of claim 6, in which the stator is interior to the rotor, the electromagnetically active diameter $D_A$ is the diameter of the rotor, and the electromagnetically active length $L_A$ is the length of the stator stack.

9. The electric ducted fan of claim 1, in which the fan has a hub-tip ratio of from 0.24 to 0.32.

10. The electric ducted fan of claim 9, in which the fan has a hub-tip ratio of from 0.26 to 0.3.

11. The electric ducted fan of claim 10, in which the fan has a hub-tip ratio of 0.28.

12. The electric ducted fan of claim 1, in which the propulsive fan has a tip pressure ratio of from 1.3 to 1.7 at an altitude of 35,000 feet and a true airspeed of Mach 0.85.

13. The electric ducted fan of claim 12, in which the propulsive fan has a tip pressure ratio of from 1.3 to 1.5, for example 1.38, at an altitude of 35,000 feet and a true airspeed of Mach 0.85.

14. The electric ducted fan of claim 13, in which the electric machine has a maximum continuous power rating of from 100 kilowatts to 100 megawatts.

15. The electric ducted fan of claim 14, in which the electric machine has a maximum continuous power rating of from 1 megawatt to 10 megawatts, for example 2 megawatts.

* * * * *